3,300,326
KAOLIN CLAY COATED WITH NEUTRALIZED MONOMERIC N,N-DIALLYLMELAMINE AND POLYESTER RESINS CONTAINING THE SAME
Thomas H. Ferrigno, Metuchen, N.J., assignor to Mineral & Chemical Philipp Corporation, Menlo Park, N.J., a corporation of Maryland
No Drawing. Filed Jan. 17, 1962, Ser. No. 166,909
5 Claims. (Cl. 106—308)

The subject invention relates to kaolin clay which is coated with a polymerizable organic monomer and relates also to improve polyester resin compositions formulated with the novel coated clay product.

Kaolin clay, in its naturally occurring hydrophilic state, is used as a mineral filler in the production of thermoset plastics from liquid unsaturated polyester resins. The clay is mixed with a liquid polymerizable unsaturated polyester resin and the mixture, together with a peroxide catalyst and frequently auxiliary ingredients, is cured to crosslink the polyester into a thermoset plastic product. Usually glass fibers are included in the composition as a reinforcing agent. In the case of polyester premixes (frequently called "doughs" or "gunks"), the glass fibers are uniformly mixed with the liquid polyester and filler and the thick mass is molded. In carrying out the so-called "preform" method, a mixture of polyester and filler is impregnated on a mat of glass fibers and the impregnated glass is molded to produce a thermoset glass laminate. The clay is used principally as a bulking agent and also to minimize shrinkage of the resin during curing. The clay is not used, however, to improve the strength of the thermoset resin and, in fact, the use of naturally occurring clay in large quantities usually appreciably reduces the tensile and flexural strength of the plastic product, particularly in premixes.

Furthermore, the clay being hydrophilic in nature, is not readily wet by the liquid polyester resin and it is difficult to disperse the clay in the liquid resin. When used in appreciable quantity, the clay increases the viscosity of the liquid polyester to a considerable degree and produces a marked thixotropic effect. In some instances, the resultant thickening effect is desirable and for certain vertical molding layups and coating applications, thixotropy in polyester resins is highly desirable. However, in many other instances a marked thickening effect of the clay on the polyester resin is very undesirable inasmuch as it limits significantly the quantity of clay filler which can be incorporated into the polyester while providing a mixture of moldable consistency.

It has been suggested to coat clays with organic compounds to improve the dispersibility in liquid organic media, such as liquid unsaturated polyester resins. Many organic compounds have been found to be useful for this purpose. Lower alkylamines and their salts, e.g., octylamine and octylamine acetate produce this desirable result when coated on clay and, in addition, these materials reduce the tendency of the clay to body the polyester resin and thereby permit the use of relatively large clay loadings in the liquid vehicle. These coating agents, however, do not improve the strength properties of the molded clay filled resin and polyester plastics formulated with the amine coated kaolin are no stronger than resins formulated with the uncoated clay. Moreover, liquid polyester systems formulated with the amine coated clay tend to set into a gel upon standing and must therefore be molded relatively soon after preparation to prevent this undesirable effect.

A principal object of my invention is the provision of a novel organic coated kaolin clay having organophilic properties. A more particular object is to provide an improved kaolin clay product especially useful as a filler in a thermoset resin prepared from a liquid unsaturated polyester resin. Another object is to provide a coated kaolin clay product which can be dispersed readily in liquid unsaturated polyester resins in appreciable quantities without bringing about a significant increase in viscosity. Still another object of my invention is the provision of organic coated kaolin clay which, when used as a filler in plastics made from liquid unsaturated polyester resins, results in molded plastics having a greater hardness, tensile strength and flexural strength than plastics made with the uncoated clay as a filler. A further object of my invention is the provision of improved molding compositions containing liquid polymerizable unsaturated polyester resins.

Further objects and features of the invention will be apparent from the description thereof which follows:

I have discovered that the usefulness of kaolin clay as a filler in plastics prepared from liquid polymerizable unsaturated polyester resins may be improved by coating particles of the clay, prior to its incorporation into the liquid resin, with a particular neutralized reactive polyfunctional triazine hereafter described.

Briefly stated, the novel filler of my invention consists of kaolin clay, the particles of the clay being uniformly coated with a small amount, e.g., from about 0.25 to 5.0 percent, based on the clay dried to constant weight at 220° F., of monomeric N,N-diallylmelamine which has been neutralized to its equivalence point by titration with an acid.

The coated kaolin clay product described above is useful in the production of molded plastics from polymerizable liquid unsaturated polyesters by both the premix and preform methods, especially the former. In both types of molding compositions, the coated clay product may be dispersed more readily into the liquid polyester than the normally hydrophilic naturally occurring clay. The viscosity of unsaturated liquid polyester compositions containing coated clays of this invention is appreciably less than the viscosity of the liquid polyester containing the same quantity of uncoated clay of the same particle size. The viscosity will vary with the quantity of coating agent used, as well as the particle size of the clay, and is relatively constant during storage. Thermoset polyester resin filled with the coated clay of this invention and made by the premix method are appreciably harder than a like resin filled with the same quantity of naturally occurring clay of the same or finer particle size. Moreover, the tensile strength and flexural strength of these filled plastics will be greater than that of the plastic filled with the same quantity of uncoated clay. Especially when the coated clay is obtained from a coarse size fraction of kaolin, the flexural strength of the coated clay filled plastic will be generally about as great as the flexural strength of the unfilled molded resin.

In producing the clay coating agent, it is essential to neutralize the diallylmelamine monomer to its equivalence point since diallylmelamine monomer which has not been neutralized or which has been treated with excess acid does not produce the desired results when coated on the clay. When incorporated into liquid unsaturated polyester resins, clay containing uneutralized monomer or overacidified monomer imparts very undesirable rheological properties to the resin. Thus, such coated clay may cause the the resin to gel or solidify upon standing. Moreover, the strength properties of resins filled with clay coated with uneutralized or overacidified monomer are poor as compared with the strength properties obtained using neutralized monomer. The particular acid that is employed to neutralize the monomer does not appear to be critical and a wide variety of acids have been used with success. As examples of suitable acids may be mentioned phosphoric, hydrofluoroboric, hydrochloric, sulfuric, hydrofluorosilicic and acetic. It is preferable to neutralize the monomer with acid before coating the clay with the monomer. Condensation products of N,N-diallylmelamine, e.g., the product obtained by condensing the amine with formaldehyde and hexadecyl alcohol, are not suitable as coating agents for the clay since the flexural and tensile strength of molded polyester resins filled with clay containing the condensation product as a coating will be poor as compared with resins filled with the uncoated clay.

The clay that is employed in carrying out this invention is kaolin clay, by which is meant a clay whose predominating mineral species is kaolinite, halloysite, anauxite, dickite or nacrite. These minerals are all hydrous aluminum silicates of the empirical formula $$Al_2O_3 \cdot 2SiO_2 \cdot 2H_2O$$

Kaolin clay, as mined, consists of fine particles together with coarse agglomerates and grit (principally quartz). It is the usual practice of clay processors to remove from the clay coarse agglomerates and gritty matter. For some commercial uses, kaolin clay is fractionated, as by hydraulic or air sedimentation methods, to obtain a fraction of clay having the desired particle size. Usually the clay is fractionated to obtain a very fine fraction which is particularly useful as an ingredient of paper coating compositions. This leaves a coarse fraction, the particle size distribution of which will depend on the amount of fines removed from the whole clay during the fractionation.

In carrying out this invention, I prefer to use a coarse fraction size of clay which has an average equivalent spherical diameter from about 4 to about 15 microns and is free from grit and particles larger than 44 microns. Whole clay (which usually has an average equivalent spherical diameter of about 1.5 micron) and fine fractions of whole clay can also be used. It is also within the scope of this invention to employ clay which has previously been calcined. All micron particle sizes, as used herein, are expressed as equivalent spherical diameters and are obtained by the well-known Andreasen method (a water sedimentation method) assigning 2.5 as the value of particle density. The term "average equivalent spherical diameter" refers to the particle size of a material which is so chosen that 50 percent by weight of the particles will be finer than that value.

In putting my invention into practice, I uniformly coat the clay particles with a very small quantity of the neutralized monomeric diallylmelamine coating material. Several methods are suitable for the purpose. The simplest procedure involves dry milling the clay with an appropriate quantity of monomer which has previously been neutralized to its equivalence point with an acid. Inasmuch as the effectiveness of the monomeric coating depends on its uniform distribution on the surface of the clay particles, the neutralized monomer is preferably applied in the form of a solution, such as a solution in a mixture of water and isopropyl alcohol, after which the solvent is removed from the clay and monomer under drying conditions controlled to prevent polymerization of the monomer. The clay can also be coated by slurrying clay with N,N-diallylmelamine in water and titrating the slurry with an acid until the equivalence point of the monomer is reached. The slurry is then vacuum filtered or reduced to a wet cake by any suitable means, dried at a product temperature not in excess of about 250° F. to remove residual water and then pulverized.

The optimum quantity of neutralized N,N-diallylmelamine monomer coated on the clay will vary inversely with the particle size of the clay. For example, a size fraction of clay having an average equivalent spherical diameter of about 10 microns is preferably coated with neutralized N,N-diallylmelamine monomer in amount of 0.5 percent by weight, whereas about 1 to 2 percent of coating is more suitable for 5 micron clay. Larger amounts, such as 5 percent, will be needed to effect optimum results with 0.5 micron clay. The quantity of coating agent will usually be kept at the minimum at which the coating agent is effective in enhancing the filler properties of the clay since the use of excessive coating agent reduces the strength of the molded polyester resin which is formulated therewith.

The liquid unsaturated polyester resins employed in producing improved molding compositions of this invention are obtained by reacting together a dihydric alcohol and a dibasic acid, either of which contains a pair of double bonded carbon atoms. The unsaturated long chain polyester molecule is essentially linear and is capable of being crosslinked to form a thermosetting resinous solid through the double bonds in the ester. A liquid unsaturated monomer, such as styrene, is employed as a crosslinking solvent, and an organic peroxide is usually employed to catalyze the crosslinking reaction. The thermoset product consists of a long chain ester linked into a three-dimensional resin with carbon-to-carbon crosslinks. The unsaturated polyesters are characterized by thermosetting without evolution of water. Commercial unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 butylene and 1:4 butylene glycols; diethylene glycol and triethylene glycol.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal correactive monomers used to reduce the viscosity of the polyester resin.

As mentioned, the crosslinking reaction is catalyzed with a peroxide catalyst, usually benzoyl peroxide. Other catalysts are methyl ethyl ketone peroxide and methyl isobutyl ketone peroxide.

Accelerators, stabilizers, promotors and coloring agents may be incorporated in the polyester when desired, as well as auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The quantity of coated clay I prefer to employ is from 10 to 200 percent, based on the weight of the liquid unsaturated polyester (inclusive of the polymerizable monomer, such as styrene). In the preparation of gunk molding mixtures containing glass fibers I prefer to employ about 50 to 150 parts of coated clay to 100 parts by weight of liquid polyester. In some instances the quantity of glass fibers may be reduced from that normally employed in premixes when my coated clay is used. A suggested proportion of glass fibers is from 10 to 30 parts per 100 parts of polyester. In laminating mixes, I prefer to use from about 20 to 100 parts by weight of coated clay to 100 parts by weight of polyester.

After the coated clay is dispersed in the liquid polymerizable unsaturated resin, the catalyst is added and the mixture is placed in a suitable mold and cured in a manner applicable to the particular polyester resin employed.

My invention is illustrated in further detail by the following examples in which all proportions of ingredients are in parts by weight unless otherwise specified.

Example I

In accordance with this invention, samples of Georgia kaolin clay were coated with neutralized N,N-diallylmelamine. The clays were: a degritted coarse size fraction of Georgia kaolin clay having an average equivalent spherical diameter of 4.8 microns and a degritted Georgia kaolin clay having an average equivalent spherical diameter of 1.5 microns.

In the preparation of the various coated clays, the dry clay was placed in a mixing vessel. To the clay there was added slowly with agitation a 10 percent solution of N,N-diallylmelamine monomer previously neutralized by titration to its equivalence point with acetic acid. The solvent used in forming the solution of neutralized N,N-diallylmelamine monomer was a 50/50 mixture of water and isopropyl alcohol. Mixing of clay with solution of monomer was conducted at room temperature. The materials were rapidly agitated for ten minutes after all of the coating material had been added and the wet samples held in a forced draft oven at 160° F. for 1¼ hours for drying. After drying, the samples were placed in a high speed hammer mill while they were still hot and the samples, after cooling, were placed in sealed glass jars.

(1(a)) To illustrate that kaolin clay which has been coated with N,N-diallylmelamine acetate, in accordance with this invention, has a lower viscosity when incorporated into a liquid unsaturated polyester resin than a resin containing the uncoated clay, the rheology of unsaturated liquid polyesters containing the coated clay of this invention was compared with the rheology of the polyester containing the same quantity of uncoated clay. Also compared were the ease of dispersion of the coated and uncoated clay in the liquid resin.

The unsaturated polyester employed in all tests was Polylite 8007, a low reactivity polyester prepared by esterification of ethylene glycol with fumaric acid and containing 40 percent styrene monomer. Viscosity measurements were made immediately after preparation of the polyester compositions and also after the compositions had aged seven days. The results are tabulated in Table I.

Data in Table I show that all size fractions of uncoated kaolin clay increase the low shear viscosity of the liquid unsaturated polyester resin and make it more thixotropic. This effect is most pronounced in the case of 1.5 micron clay which brings about a marked increase in low shear viscosity of the resin and therefore restricts the quantity of clay which can be incorporated into the resin. In contrast, the data show that all particle size grades of kaolin clay which have been previously coated with N,N-diallylmelamine acetate, in accordance with this invention, resulted in compositions having viscosities which were significantly lower than the viscosity of the resin containing uncoated clay of the same particle size. The low shear viscosity of the resin containing coated 4.8 micron clay was about the same as that of the resin per se, although the resin containing coated clay was more thixotropic.

The data show also that clay coated with N,N-diallylmelamine acetate could be dispersed into the resin with greater ease than the uncoated clay.

(1(b)) The strength characteristics of molded Polylite 8007 resins filled with N,N-diallylmelamine acetate coated kaolin clays were measured and compared with the strength characteristics of the same resin filled with (1) the same quantities of uncoated clay and (2) the unfilled resin. The results are tabulated in Table II.

In the preparation of the moldings, portions of some of the freshly prepared resin-filler mixes of Example 1(a) were molded after addition of 1 percent of benzoyl peroxide catalyst (based on the weight of polyester including styrene monomer). The mixes were cast in a glass mold which consisted of a U-shaped piece of ⅛-inch asbestos gasketing 1-inch wide and having 12-inch legs. Silicone mold releasing agent was applied to the gasket which was placed between two pieces of plate glass (each 1-foot square) and which had been sprayed with mold release agent. This assembly was secured and filled with the resin-filler mixture.

The resin was cured by placing the filled mold in a cold forced draft oven and raising the oven temperature to 180° F. in an hour. The temperature was held at 180° F. for one hour and shut off. The mold and oven were permitted to cool to room temperature.

Data in Table II show that the use of uncoated clay filler in the polyester reduced tensile and flexural strength of the molded resin and improved hardness. By using N,N-diallylmelamine acetate coated clay, the hardness of the clay-filled molding was further improved and the tendency of the clay to impair the flexural and tensile strength was reduced. In fact, the data show that the flexural strength of the coated coarse size fraction of clay was substantially the same as the flexural strength of the molded resin made up without any filler.

Example II

The 4.8 micron clay of Example I was coated with 1 percent by weight of various amines salts including amine salt coating agents of the prior art and the effect of such coatings on the properties of the clay filled Polylite 8007 resin was studied.

The clays were mixed into the polyester employed in Example I and the Brookfield viscosity and physical properties of the molded resin compositions were investigated as in the previous example. The results are summarized in Table III.

A comparison of the results reported in Table III with results reported in Table I and Table II show that plastics filled with kaolin clay coated with a variety of neutralized amines outside the scope of this invention, including a neutralized amine containing the alpha-beta enol unsaturation characteristic of amines within the scope of this invention, do not possess the flexural and tensile strength of resins filled with coated clays within the scope of this invention.

Also shown is that most of the neutralized amines outside the scope of this invention gelled the polyester resin upon standing.

TABLE I.—THE EFFECT OF COATING VARIOUS PARTICLE SIZES OF KAOLIN CLAY WITH A MONOMERIC N,N-DIALLYLMELAMINE SALT ON THE VISCOSITY OF SUSPENSIONS IN AN UNSATURATED POLYESTER RESIN [1]

| Clay Filler Average Equivalent Spherical Diameter | Clay Coating | Percent Coating | Brookfield Viscosity, cp. X10³ | | | | Dispersibility of Clay in Resin |
|---|---|---|---|---|---|---|---|
| | | | Initial | | After 7 days | | |
| | | | 10 r.p.m. | 100 r.p.m. | 10 r.p.m. | 100 r.p.m. | |
| No filler | | | 4.2 | 4.3 | 4.5 | 4.5 | |
| 1.5 Microns | No coating | | 29.5 | 8.6 | 23.5 | 7.6 | Difficult to disperse; required high shear mixing. |
| 4.8 Microns | do | | 9.7 | 4.3 | 8.5 | 4.5 | |
| 1.5 Microns | N,N-diallylmelamine acetate. | 1.5 | 11.5 | 5.6 | 11.4 | 6.4 | Readily dispersed with mild agitation. |
| 4.8 Microns | do | 0.5 | 4.5 | 3.1 | 4.4 | 3.2 | |

[1] 40 parts clay/60 parts Polylite 8007 resin.

TABLE II.—THE EFFECT OF COATING KAOLIN CLAY FILLERS WITH N,N-DIALLYLMELAMINE ACETATE ON THE STRENGTH PROPERTIES OF MOLDED UNSATURATED POLYESTER RESIN [1]

| Clay Filler Average Equivalent Spherical Diameter, Microns | Clay Coating, Weight Percent | Tensile Strength, p.s.i.×$10^3$—ASTM, D638-58T | Flexural Strength, p.s.i.×$10^2$—ASTM, D790-58T | Barcol Hardness |
|---|---|---|---|---|
| No Filler | | 8.47 | 10.25 | 39.5 |
| 1.5 | No coating | 4.13 | 8.29 | 44.8 |
| 4.8 | ----do---- | 5.34 | 9.69 | 42.8 |
| 1.5 | 1% N,N-diallylmelamine acetate | 4.97 | 8.58 | 46.0 |
| 4.8 | 0.5% N,N-diallylmelamine acetate | 5.84 | 10.22 | 45.0 |

[1] 40 parts clay/60 parts Polylite 8007 resin.

TABLE III.—THE EFFECT OF COATING 4.8 MICRON KAOLIN CLAY WITH VARIOUS AMINE SALTS ON THE PROPERTIES OF POLYESTER RESIN [1] BEFORE AND AFTER MOLDING

| Clay Coating [2] | Tensile Strength, p.s.i.×$10^3$—ASTM, D638-58T | Flexural Strength, p.s.i.×$10^3$—ASTM, D790-58T | Barcol Hardness | Brookfield Viscosity, cp.×$10^3$ | | | |
|---|---|---|---|---|---|---|---|
| | | | | Initial | | After 7 days | |
| | | | | 10 r.p.m. | 100 r.p.m. | 10 r.p.m. | 100 r.p.m. |
| No Filler | 8.47 | 10.25 | 39.5 | 4.2 | 4.3 | 4.5 | 4.5 |
| Uncoated Clay | 5.34 | 9.69 | 42.8 | 9.7 | 4.3 | 8.5 | 4.5 |
| Rosin Amine D Stearate | 5.90 | 9.40 | 45.5 | 1.90 | 9.82 | ([4]) | ([5]) |
| Octylamine Acetate | 3.0 | 8.8 | 45.0 | 3.4 | 2.3 | ([5]) | ([5]) |
| 1 Mol Armeen T [3] / 1 Mol Acrylic Acid | 2.60 | 7.36 | | 5.5 | 2.25 | 5.5 | 2.39 |

[1] 40 parts clay/60 parts Polylite 8007.
[2] All coatings at 1% of the dry clay weight.
[3] A mixture of about 2% tetradecylamine, 24% hexadecylamine, 28% octadecylamine and 46% octadecenylamine.
[4] Partially gelled.
[5] Rubbery gel.

I claim:

1. Naturally occurring Georgia kaolin clay having an average equivalent spherical diameter within the range of about 1.5 to about 15 microns,
the particles of said clay being uniformly coated with about ½ percent to about 5 percent by weight of monomeric N,N-diallylmelamine which has been neutralized with an acid to the equivalence point.

2. Naturally occurring Georgia kaolin clay having an average equivalent spherical diameter within the range of about 1.5 to about 15 microns,
the particles of said clay being uniformly coated with about ½ percent to about 5 percent by weight of monomeric N,N-diallylmelamine acetate.

3. The product of claim 2 wherein said clay has an average equivalent spherical diameter of about 5 microns and said clay is coated with about ½ to about 2 percent by weight of N,N-diallylmelamine acetate.

4. A laminating resin mixture comprising from about 20 to 100 parts by weight of the product of claim 3 and about 100 parts by weight of liquid polymerizable unsaturated polyester resin which consists essentially of the reaction product of a saturated polyhydric alcohol and at least one unsaturated dibasic acid.

5. A molding mixture comprising about 50 to 150 parts by weight of the product of claim 3, about 10 to 30 parts by weight of glass fibers and 100 parts by weight of a liquid polymerizable unsaturated resin which consists essentially of the reaction product of a polyhydric alcohol and at least one unsaturated dibasic acid.

References Cited by the Examiner

UNITED STATES PATENTS

| | | | |
|---|---|---|---|
| 2,567,847 | 9/1951 | Kaiser | 260—249.6 XR |
| 2,712,004 | 6/1955 | Thomas | 260—249.6 XR |
| 2,892,807 | 6/1959 | Sellers et al. | 260—41.5 |
| 2,948,632 | 8/1960 | Albert et al. | 260—40 XR |
| 2,975,147 | 3/1961 | Abbott et al. | 260—40 XR |
| 2,999,080 | 9/1961 | Wilcox | 260—40 |
| 3,032,431 | 5/1962 | Ferrigno | 260—40 XR |

MORRIS LIEBMAN, *Primary Examiner.*

MILTON STERMAN, ALEXANDER H. BRODMERKEL, *Examiners.*

A. H. KOECKERT, *Assistant Examiner.*